Figures 1, 2:
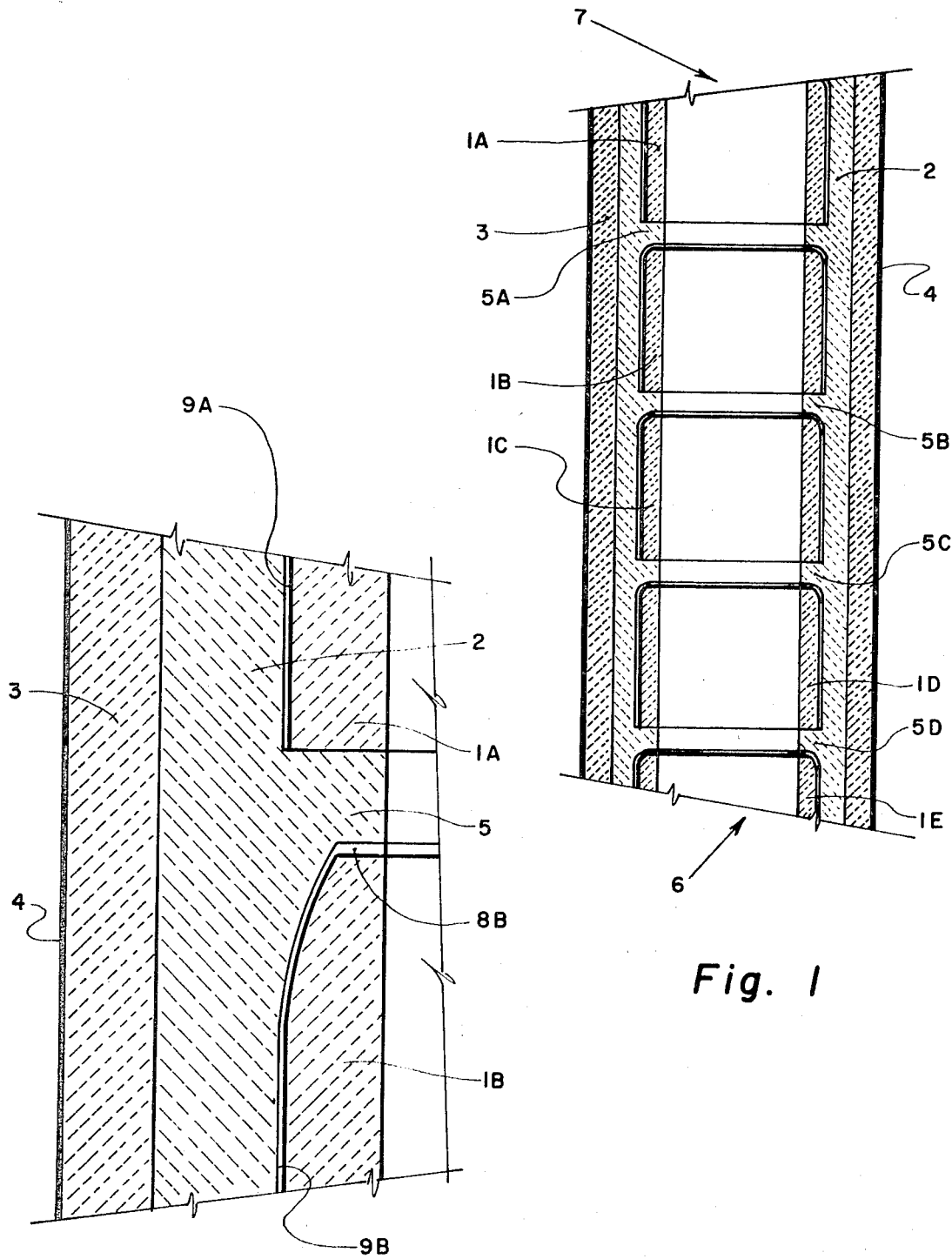

United States Patent
Bauer et al.

[15] 3,656,721
[45] Apr. 18, 1972

[54] REFRACTORY STRUCTURE

[72] Inventors: Jean-Michel Bauer, Chatou; Andre Brossard, La Garenne-Colombes, both of France

[73] Assignee: Societe Generales des Produits Refractaires, Paris, France

[22] Filed: July 20, 1970

[21] Appl. No.: 56,445

[30] Foreign Application Priority Data

July 18, 1969 France.................................6924459

[52] U.S. Cl. ............................................................263/19 R
[51] Int. Cl................................................................F23l 9/04
[58] Field of Search...........................................263/19 R, 51

[56] References Cited

UNITED STATES PATENTS

| | | | |
|---|---|---|---|
| 1,943,558 | 1/1934 | Schaefer...................................| 263/19 |
| 814,949 | 3/1906 | Edgar........................................| 263/19 |

Primary Examiner—John J. Camby
Attorney—Webb, Burden, Robinson & Webb

[57] ABSTRACT

A refractory insulating structure for a hollow combustion shaft comprising an interior and backup lining. The interior lining comprises a plurality of interior ring sections spaced along the length of the shaft. The backup lining is continuous and has a plurality of internal corbels spaced along the length of the shaft such that each interior ring section is supported by a corbel.

4 Claims, 2 Drawing Figures

INVENTORS
JEAN-MICHEL BAUER
ANDRE BROSSARD
BY Webb, Burden, Robinson & Webb

REFRACTORY STRUCTURE

Combustion shafts for cowper-type regenerator stoves used in conjunction with ironmaking blast furnaces are continually being constructed larger and larger and are being operated at higher and higher temperatures. In fact, some are currently constructed with heights that exceed 30 meters and in which mixtures are burned at combustion temperatures exceeding 1,600° C. These design factors cause mechanical and thermal stresses which tend to exceed the capabilities of the refractory materials comprising combustion shaft linings in spite of the considerable progress made by the producers of refractory products. Few economical refractory products can withstand the high temperatures and high pressures (due to the load of the refractory lining itself) found in the newer combustion shafts.

Refractory structures and linings according to this invention are especially suitable for the construction of exterior combustion shafts for a cowper-type regenerator stove (cowper with separate shafts) but this invention also has application to interior shafts of circular or elliptical shape.

A separate combustion shaft typically consists, from the inside towards the outside, of an interior refractory lining of a material capable of withstanding the temperature prevailing inside the shaft, then of a second refractory lining subjected to an average temperature lower than the interior lining, then preferably by one or more refractory insulating rings, and finally by a metallic mantel assuring tightness. All refractory or insulating linings are generally concentric with the shaft.

It is an advantage of refractory structures and linings according to the present invention that the interior lining is mechanically supported so that the refractory materials therein do not have to support the excessive pressure at ever increasing temperatures.

Briefly according to this invention, a refractory insulating structure for a hollow combustion shaft comprises an interior and backup lining. The interior lining comprises a plurality of interior rig sections spaced horizontally along the length of the shaft. The backup lining is continuous and has a plurality of internal corbels spaced at suitable intervals along the length of the shaft such that each interior ring section is supported by a corbel. According to a preferred embodiment of this invention, a composite refractory insulating lining is provied for an external combustion shaft of a cowper-type regenerator stove. The shaft has a tubular external airtight shell. Disposed therein is the refractory insulating structure set forth above. The structure comprises an interior refractory lining of a material suitable for withstanding the temperatures in the interior of the shaft and a backup refractory lining suitable for withstanding temperatures lower than those in the interior of the shaft and suitable for supporting its own weight in addition to the weight of the interior lining. Preferably, the interior ring sections comprise a refractory insulating material having a density between about 1 gm/cc to 1.3 gm/cc and the backup lining comprises a conventional fireclay, mullite of high alumina refractory material.

In this way each ring section of the hot interior lining does not support the load of the entire height of the interior lining thereabove, but at most the load due to its own lesser height. The load of the successive ring sections is transferred to the backup ring which, having a lower temperature, can support a higher load. Thus the application of traditional refractories is expanded.

Furthermore, refractory structures or linings according to this invention enable the interior sections to comprise low density refractory materials, if desired, having a pyroscopic resistance at least equal to the one of customary heavy materials which, however, cannot be used for the interior lining because of their lower resistance to deterioration. In this instance there are the further benefits of reducing the total load transferred to the backup lining and of reducing the average temperature of that lining. This results because the insulating capacity of light (lower density) refractories is superior to heavier (higher density) refractories. Among the light refractories that can be used are porous mullite (density from 1 to 1.3 gm/cc, pyroscopic resistance 1,790° C.), porous alumina (1.25 gm/cc - 2,000° C.), porous silica (1.05 gm/cc - 1,700° C.). The interior ring sections may be constructed of brick or may be monolithic refractory materials such as castables.

Further features and other objects and advantages of this invention will become apparent from a study of the following detailed description made with reference to the drawings in which:

FIG. 1 is a section of a combustion shaft having a refractory structure or lining according to this invention, and FIG. 2 is a partial section in detail of same.

Referring now to FIGS. 1 and 2, the interior lining comprises ring sections 1A to 1E spaced horizontally. The backup lining 2 is continuous and has corbels 5A to 5E, each supporting an interior ring section. Exterior the backup lining is an insulating lining 3 enclosed in a substantially airtight metal mantel or shell 4. The lower end 6 of the shaft faces the burner and the upper end 7 faces the cupola.

A certain amount of horizontal allowance 8B is provided between the top of ring sections 1A to 1B and the adjacent backup lining to accommodate differential expansion. Also, vertical allowance, 9A and 9B, is provided to assure independence and expansion of the ring sections.

As as example, a combustion shaft according to this invention has a 1.80 meter inner diameter and a height of 30 meters. It includes six interior ring sections 200 mm thick of porous mullite 5 meters high, each weighting 7.8 tons. The bottom of each ring section normally supports this load, whereas the bottom of a single section 30 meters high of porous mullite would never have sufficient strength at the elevated temperatures encountered to support itself. By way of comparison, the weight of a single ring 30 meters high of heavy mullite is about 125 tons. At the operating temperatures encountered the load near the bottom of the lining would approach the limits of the strength of the refractory material therein.

The backup lining of the shaft is 200 mm thick and consists of bricks of heavy mullite. The assembly is completed by an exterior insulation of 120 mm thickness. When the temperature of the inner side of the first interior ring of porous mullite is 1,450° C. the temperature of the outer side of this first ring and the inner side of the second ring of heavy mullite is approximately 1,200° C. and the temperature of the outer side of the second ring and the inner side of the exterior insulation is 1,100° C.

The claims:

1. A refractory insulating structure for a hollow combustion shaft comprising an interior and backup lining, said interior lining comprising a plurality of interior ring sections horizontally spaced along the length of the shaft, said backup lining being continuous and having a plurality of internal corbels spaced along the length of the shaft such that each interior ring is supported by a corbel.

2. A composite refractory insulating lining for the external combustion shaft of a cowper-type regenerator stove having a tubular external airtight shell, said lining comprising an interior refractory lining of a material suitable for withstanding the temperatures in the interior of the shaft and a backup refractory lining suitable for withstanding temperatures lower than those in the interior of the shaft and suitable for supporting its own weight in addition to the weight of the interior lining, said interior lining comprising a plurality of interior ring sections horizontally spaced along the length of the shaft, said backup lining being continuous and having a plurality of internal corbels spaced along the length of the shaft such that each interior ring is supported by a corbel.

3. The lining according to claim 2 in which the refractory lining comprises a refractory insulating material having a density between about 1 gm/cc to 1.3 gm/cc.

4. The lining according to claim 3 in which the backup lining comprises a material selected from the group consisting of fireclay, mullite and high alumina refractories.

* * * * *